United States Patent [19]

Pines et al.

[11] Patent Number: 5,587,784
[45] Date of Patent: Dec. 24, 1996

[54] MULTISPECTRAL-STARING SENSOR

[75] Inventors: Michael Y. Pines, Los Angeles; Donald F. King, Playa Del Rey, both of Calif.

[73] Assignee: Hughes Electronics, Los Angeles, Calif.

[21] Appl. No.: 491,133

[22] Filed: Jun. 16, 1995

[51] Int. Cl.⁶ .................. G01C 3/08; G01J 5/02
[52] U.S. Cl. ............... 356/4.01; 250/339.05; 250/339.14
[58] Field of Search .......... 250/339.01, 339.02, 250/339.05, 339.14, 330; 356/4.01; 244/3.16

[56] References Cited

U.S. PATENT DOCUMENTS

| | | | |
|---|---|---|---|
| 3,971,939 | 7/1976 | Andressen | 250/334 |
| 4,009,393 | 2/1977 | Ashley, Jr. et al. | 250/339 |
| 4,325,083 | 4/1982 | Rouchon et al. | 358/228 |
| 4,345,840 | 8/1982 | Goetz et al. | 356/407 |
| 4,599,001 | 7/1986 | Richard | 356/419 |
| 5,047,638 | 9/1991 | Cameron et al. | 250/330 |

*Primary Examiner*—Mark Hellner
*Attorney, Agent, or Firm*—Michael W. Sales; Wanda K. Denson-Low

[57] ABSTRACT

A multispectral imaging sensor. The inventive sensor (10) includes a broadband detector (30) capable of sensing electromagnetic energy across a spectra of interest. A filter arrangement (20) is mounted within the sensor in alignment with the detector (30). The sensor arrangement (20) includes a first filter (24) with a first passband, a second filter (26) with a second passband, and a mechanism for selectively positioning either the first filter (24) or the second filter (26) in optical alignment with the detector (30). In a specific embodiment, infrared and visible light are directed to the filter arrangement by a reflective optical arrangement (16, 18, 19). The positioning arrangement includes a turntable (22) on which the first filter (24) and second filter (24) are disposed. A motor (27) activates the turntable (220 from a first position at which the first filter (24) is in alignment with the detector (30) and the reflective optical arrangement (16, 18, 19) to a second position at which the second filter (26) is in alignment with the detector (30) and the optical arrangement (16, 18, 19). Multispectral imaging sensing is effected by simply switching the appropriate filter into the optical path of the detector (30).

19 Claims, 2 Drawing Sheets

5,587,784

MULTISPECTRAL-STARING SENSOR

BACKGROUND OF THE INVENTION

1. Field of the Invention

The present invention relates to the design and manufacture of imaging systems. More specifically, the present invention relates to the design and manufacture of staring sensor systems.

2. Description of the Related Art

Numerous imaging sensing technologies are known in the art. Certain sensors are preferred for particular applications and requirements. For example, visible sensors are easy to view, however, infrared sensors are more useful for imaging in conditions of low light levels or where the image my be obscured by smoke or weather conditions.

Unfortuantely, some applications require both sensing capabilities. In military applications, for example, an understanding of the reflectance and emission signature of targets of interest over a wide range of wavelengths is important to furthering the effectiveness of electro-optical sensors. It is also necessary to understand how varying atmospheric conditions can attenuate/degrade these signatures as they propagate through the atmosphere over extended ranges. Comparing and/or combining the image signature data from more than one spectral sub-band can provide additional information which enhances the ability to detect and identify certain military targets.

However, inasmuch as conventional imaging systems are designed for a particular portion of the electromagnetic spectrum, applications requiring the imaging of the visible and infrared portions of the spectrum, for example, typically required two separate sensors and a separate electronic signal processing system for each sensor. This approach was dictated by the fact that 1) most detectors can only cover a portion of the entire desired spectral range and 2) it is virtually impossible to design refractive optics which can provide equally high imaging performance across such a wide spectral range.

In addition to the high cost, size and weight associated with a multiple sensor approach to multispectral applications, the use of multiple sensors may force the incorporation of other costly features into the design. For example, the use of two separate sensors for military applications may require the provision of two apertures in armored vehicles.

Also, if it is desired to combine or blend the imagery from different spectral bands, this "data fusion" must be accomplished via digital post-processing of the separate imaging channels using electronics which add further to the overall cost of the system.

Further, if quantitative scene measurements are desired, the use of different optics and detectors (often with different array formats and responses) introduces additional measurement complexities.

Hence, there is a need in the art for a multispectral imaging system.

SUMMARY OF THE INVENTION

The need in the art is addressed by the present invention which provides a multispectral imaging sensor. The inventive sensor includes a detector capable of sensing electromagnetic energy across a spectra of interest. A filter arrangement is mounted within the sensor in alignment with the detector. The sensor includes a first filter with a first passband, a second filter with a second passband, and a mechanism for selectively positioning either the first filter or the second filter in optical alignment with the detector.

In a specific embodiment, infrared and visible light are directed to the filter arrangement by a reflective optical arrangement. The positioning arrangement includes a turntable on which the first filter and a second filter are disposed. A motor activates the turntable from a first position at which the first filter is in alignment with the detector and the reflective optical arrangement to a second position at which the second filter is in alignment with the detector and the optical arrangement.

Multispectral imaging sensing is effected by simply switching the appropriate filter into the optical path of the detector.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
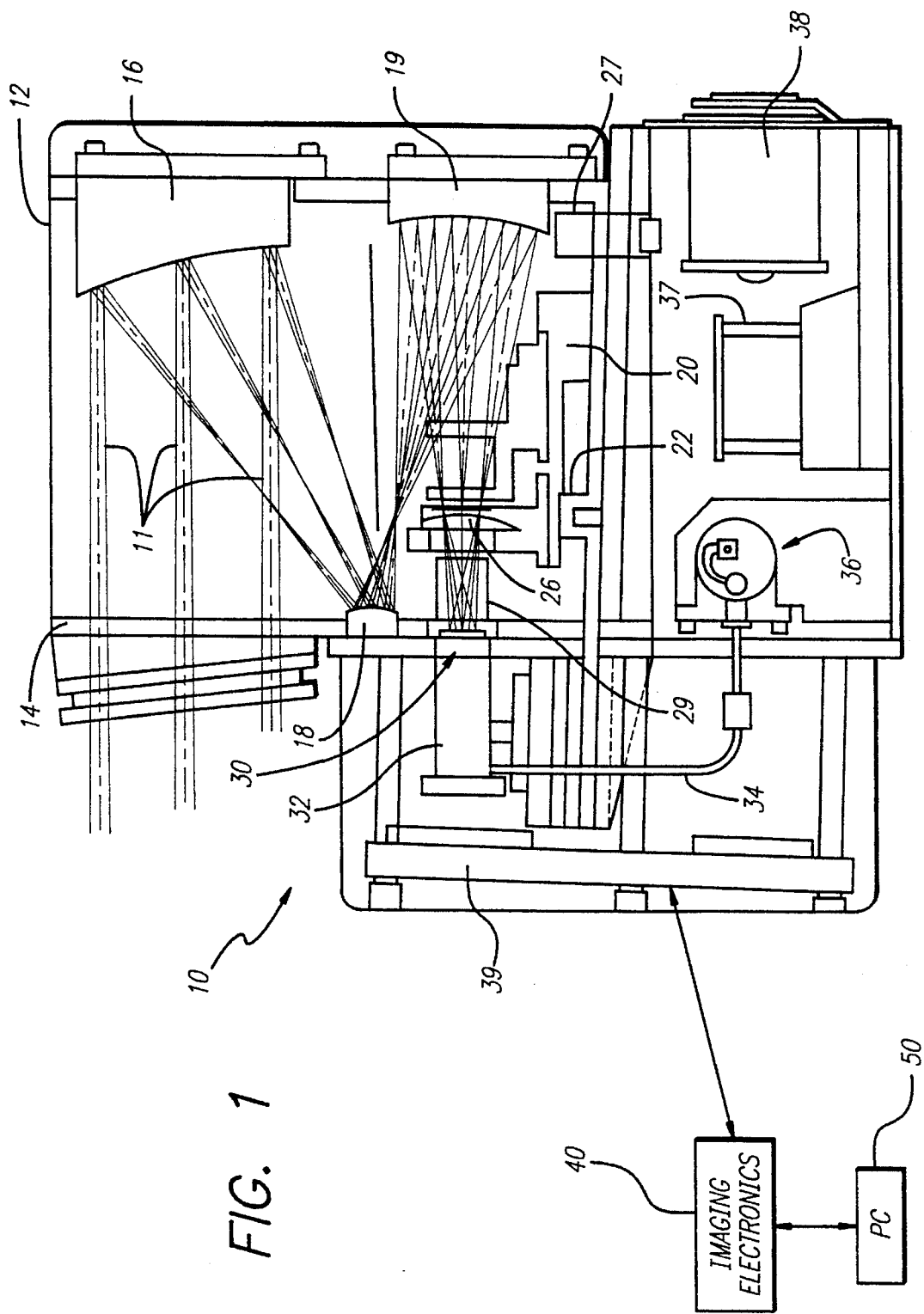
FIG. 1 is a sectional side of the multispectral staring sensor of the present invention.

FIG. 1 is a sectional side of the multispectral staring sensor of the present invention. The sensor 10 includes a housing 12 made of aluminum or other suitable material. A protective window 14 is provided at an input aperture of the housing 12. The window 14 is a transmissive broadband window design to protect the high-performance mirrored surfaces within the housing 12 from the external environment. As it is not a powered optical element, the window 14 is not essential to the operation of the invention, nor does it compromise the ability of the system 10 to image the desired wide spectral band.

Electromagnetic energy is reflected by three powered mirrors 16, 18 and 19 to a filter mechanism 20. The optical ray path 11 is depicted in FIG. 1 by multiple lines entering the optical aperture, reflecting off the mirror elements and ultimately terminating on the detector array. The three powered mirrors include a concave primary mirror 16. The primary mirror 16 reflects the energy 11 to a secondary mirror 18. The secondary mirror 18 reflects the energy to a tertiary mirror 19 from which it is reflected to the detector 30 via the filter assembly 20. The primary, secondary, and tertiary mirrors 16, 18 and 19 respectively, are of conventional design.

Figure 2:
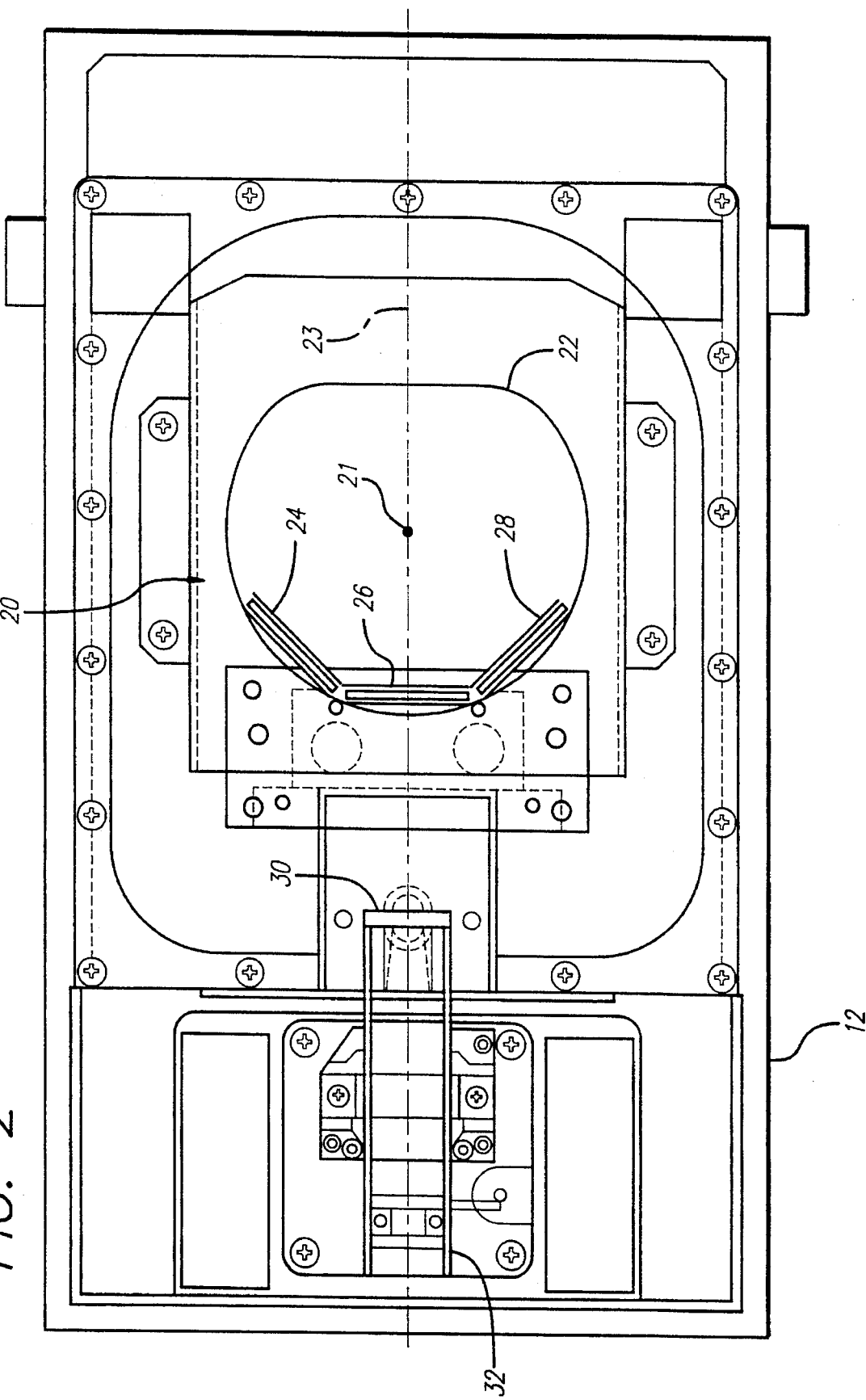
FIG. 2 is a sectional top view of the multispectral sensor of the present invention.

FIG. 2 is a sectional top view of the multispectral sensor of the present invention. As best depicted in FIG. 2, the filter mechanism 20 includes a turntable 22 on which three filters 24, 26 and 28 are fixed. The turntable 22 is adapted for rotation about a pivot point 21 when actuated manually or by a motor (not shown) in response to electronic circuit (not shown). The optical axis 23 is depicted in FIG. 2 as being parallel to the optical path 11 (not shown). The turntable 22 has a cylindrical or disk shape and is constructed of aluminum or other suitable material. The turntable 22 can accomodate a number of filters. The filters may be of custom design for a particular application in accordance with conventional filter design methodology. In the preferred embodiment, at least one of the filters passes energy in the infrared portion of the spectrum only and one passes energy in the visible portion of the spectrum only. Each of the filters are installed prior to system operation. Each filter is fixed in a vertical orientation by a filter holder or mount. A given filter may be selected by rotating the turntable so that the filter is disposed in the optical path of the detector 30.

Returning to FIG. 1, a conventional optical stop 29 is interposed between the filter assembly 20 and the detector 30. In the illustrative embodiment, the detector 30 is a large format, high-performance, broadband indium antimonide (InSb) staring detector array sensitive to radiation with wavelengths ranging from approximately 0.5 microns to greater that about 5 microns. The InSb stating detector array is a device which can be obtained in several different array formats and sizes from several different sources. The majority of commercially available sensor systems incorporating InSb detector arrays, however, are designed for imaging only within the medium wave infrared (MWIR) (3–5 micron) spectral band and include optics and filters which restrict operation to this band. While some available InSb detectors are capable of responding to shorter (near-infrared) wavelengths, only the VISMIP$_{tm}$ detectors sold by Santa Barbara Research Center (SBRC), a subsidiary of Hughes Aircraft Company, are capable of responding down to 0.5 microns with a very flat spectral response over the entire 0.5–5+micron range. For this reason, the VISMIR$_{tm}$ detector from SBRC is preferred. This detector must be installed in the vacuum dewar and be cooled down to a temperature of approximately 77° K. through the use of an integrated cryogenic cooler.

Hence, as shown in FIG. 1, the detector 30 is housed within a vacuum dewar 32. A transfer line 34 couples the dewar 32 to a linear cryogenic cooler 36 of a design appropriate for the detector.

A first electronics board 37 (shown in phantom) is mounted within the housing 12 to generate the controls for the motor shown generally at 27. All components within the housing are cooled by a fan 38. The first board 37 is connected to a second electronics board (shown in phantom) 39 which processes the signals from the detector 30 in a conventional manner and outputs the signals to imaging electronics 40. The board 39 provides the necessary bias voltages and clock signal waveforms to the detector readout circuit to receive and process the video output signals from the detector 30 and to operate the cooler 36. The output of the imaging electronics is input to a conventional video monitor for display.

In sum, the detector array 30 provides the basic capability to sense radiation over a wide range of wavelengths, the all-reflective optics permit high quality imaging of the entire range of wavelengths of the detector, and the filter mechanism permits the operator to image only the desired portion (sub-band) of the total detector spectral band for which the appropriate filter has been installed. By commanding the mechanism to position a different filter in the optical path, the sensor can rapidly switch from imgaing one spectral sub-band to another. Thus, a single sensor can be sued to image and compare the same scene in several different spectral bands, or, with the appropriate custom filters, to display imagery comprised of some desired combination of widely-differing wavelengths (e.g., 0.5–0.7 microns and 4–5 microns).

Thus, the present invention has been described herein with reference to a particular embodiment for a particular application. Those having ordinary skill in the art and access to the present teachings will recognize additional modifications applications and embodiments within the scope thereof. For example, those skilled in the art will appreciate that the invention is not limited to the number of filters shown. In addition, other approaches which use rotary or linear translators, motorized or manually-operated mechanisms to switch/insert a number of different spectral filters into the optical train are also included within the scope of the present invention. In addition, functionally equivalent approaches to the detector arrangement may be used.

It is therefore intended by the appended claims to cover any and all such applications, modifications and embodiments within the scope of the present invention.

Accordingly,

What is claimed is:

1. A multispectral imaging sensor comprising:

first means for sensing electromagnetic energy, the first means including a broadband detector capable of sensing energy in multiple bands of an electromagnetic spectrum;

second means in alignment with the first means for selectively filtering the electromagnetic energy for input to the first means, the second means including:
a first filter with a first passband,
a second filter with a second passband, and
means for selectively positioning either the first filter or the second filter in optical alignment with the first means; and third means for directing electromagnetic energy from an input aperture to the second means.

2. The invention of claim 1 wherein the broadband detector is capable of sensing energy in the visible and infrared portions of an electromagnetic spectrum.

3. The invention of claim 2 wherein the detector is a VISMIR detector.

4. The invention of claim 3 further including a dewar for the detector.

5. The invention of claim 4 further including means for cooling the dewar.

6. The invention of claim 2 wherein the first filter passes energy in an infrared portion of the electromagnetic spectrum and the second filter passes energy in a visible portion of the electromagnetic spectrum.

7. The invention of claim 1 wherein the means for positioning includes a turntable on which the first filter and second second filter are disposed.

8. The invention of claim 7 wherein the means for positioning further includes means for activating the turntable from a first position at which the first filter is in alignment with the first means and the third means to a second position at which the second filtter is in alignment with the first means and the third means.

9. The invention of claim 1 wherein the second means further includes a third filter.

10. The invention of claim 1 wherein the third means is a reflective optical arrangement.

11. The invention of claim 10 wherein the optical arrangement includes a primary mirror, a secondary mirror and a tertiary mirror disposed in optical alignment with the input aperture and the second means.

12. A multispectral imaging sensor comprising:

first means for sensing electromagnetic energy, the first means including a broadband detector capable of sensing energy in multiple bands of an electromagnetic spectrum;

second means in alignment with the first means for selectively filtering the electromagnetic energy for input to the first means, the second means including:
a first filter with a first passband,
a second filter with a second passband, and
means for selectively positioning either the first filter or the second filter in optical alignment with the first means; and third means for directing electromagnetic energy from an input aperture to the second means, the third means including a reflective optical arrangement.

13. The invention of claim 12 wherein the first filter passes energy in an infrared portion of the electromagnetic spectrum and the second filter passes energy in a visible portion of the electromagnetic spectrum.

14. The invention of claim 12 wherein the means for positioning includes a turntable on which the first filter and second second filter are disposed.

15. The invention of claim 14 wherein the means for positioning further includes means for activating the turntable from a first position at which the first filter is in alignment with the first means and the third means to a second position at which the second filtter is in alignment with the first means and the second means.

16. The invention of claim 15 further including a motor for actuating the turntable and electronic means for controlling the acutation of the motor.

17. The invention of claim 1 wherein the second means further includes a third filter.

18. The invention of claim 1 wherein the optical arrangement includes a primary mirror, a secondary mirror and a tertiary mirror disposed in optical alignment with the input aperture and the second means.

19. A method for sensing energy in multiple bands of the electromagnetic spectrum including the steps of:

reflecting input electromagnetic energy to through a first filter having a first passband to a broadband detector capable of sensing energy in multiple bands of an electromagnetic spectrum;

substituting a second filter for the first filter, the second filter having a second passband; and detecting the input electromagnetic energy passed by the second filter.

* * * * *